(12) United States Patent
Leeman et al.

(10) Patent No.: US 12,508,999 B2
(45) Date of Patent: Dec. 30, 2025

(54) VEHICLE SENSOR LENS HOOD

(71) Applicant: Motional AD LLC, Boston, MA (US)

(72) Inventors: Peter Leeman, Pittsburgh, PA (US);
William Buono, Pittsburgh, PA (US);
John Landreneau, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 407 days.

(21) Appl. No.: 18/166,050

(22) Filed: Feb. 8, 2023

(65) Prior Publication Data

US 2024/0123914 A1    Apr. 18, 2024

Related U.S. Application Data

(60) Provisional application No. 63/416,295, filed on Oct. 14, 2022.

(51) Int. Cl.
| | | |
|---|---|---|
| *B60R 11/04* | (2006.01) | |
| *B60S 1/08* | (2006.01) | |
| *G02B 27/00* | (2006.01) | |
| *G03B 11/04* | (2021.01) | |

(52) U.S. Cl.
CPC ............ *B60R 11/04* (2013.01); *B60S 1/0848* (2013.01); *G02B 27/0006* (2013.01); *G03B 11/045* (2013.01)

(58) Field of Classification Search
CPC ... B60R 11/04; B60S 1/0848; G02B 27/0006; G03B 11/045; G01S 13/931; G01S 17/931
See application file for complete search history.

(56) References Cited

U.S. PATENT DOCUMENTS

| | | | |
|---|---|---|---|
| 2011/0292212 A1 | 12/2011 | Tanabe et al. | |
| 2014/0060582 A1* | 3/2014 | Hartranft | G03B 17/08 |
| | | | 348/148 |
| 2016/0325715 A1 | 11/2016 | Niemczyk | |
| 2017/0192226 A1 | 7/2017 | Eineren et al. | |
| 2017/0259789 A1* | 9/2017 | Mcandrew | B60S 1/56 |
| 2020/0238955 A1* | 7/2020 | Walsøe | G02B 27/0006 |
| 2021/0278570 A1* | 9/2021 | Hottmann | G03B 11/045 |

FOREIGN PATENT DOCUMENTS

CN      201923085 U      8/2011

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
International Search Report and Written Opinion received for PCT Application No. PCT/US2023/076366, mailed Feb. 8, 2024.
International Preliminary Report received for PCT Application No. PCT/US2023/076366, mailed Apr. 24, 2025.

* cited by examiner

*Primary Examiner* — Charles S Chang
(74) *Attorney, Agent, or Firm* — Knobbe, Matens, Olson & Bear, LLP

(57) ABSTRACT

Vehicle sensor lens hoods for reduction of straylight on an image sensor lens, which can include a body, a first aperture, and a second aperture. The lens hood can further be associated with a structure, such as a fascia, of a vehicle. Vehicles and autonomous vehicles products are also provided.

20 Claims, 9 Drawing Sheets

VEHICLE SENSOR LENS HOOD

CROSS-REFERENCE TO RELATED APPLICATIONS

The present application claims priority/benefit from U.S. Provisional Application No. 63/416,295 filed on Oct. 14, 2022, entitled "VEHICLE SENSOR LENS HOOD," which is herein incorporated by reference in its entirety.

BACKGROUND

Current vehicles typically incorporate one or more image sensors, such as cameras (e.g., backup cameras). These image sensors are used for providing details to drivers as well as for operation of autonomous vehicles. However, image sensors can exhibit performance issues as a result of straylight (e.g., flare light). In particular, a narrow field-of-vision (FoV) image sensor can be affected by straylight from the sun and/or other lights on the road. A wide FoV camera, such as used on a rear bumper, may be negatively affected by license plate lights.

DETAILED DESCRIPTION

Figure 1:
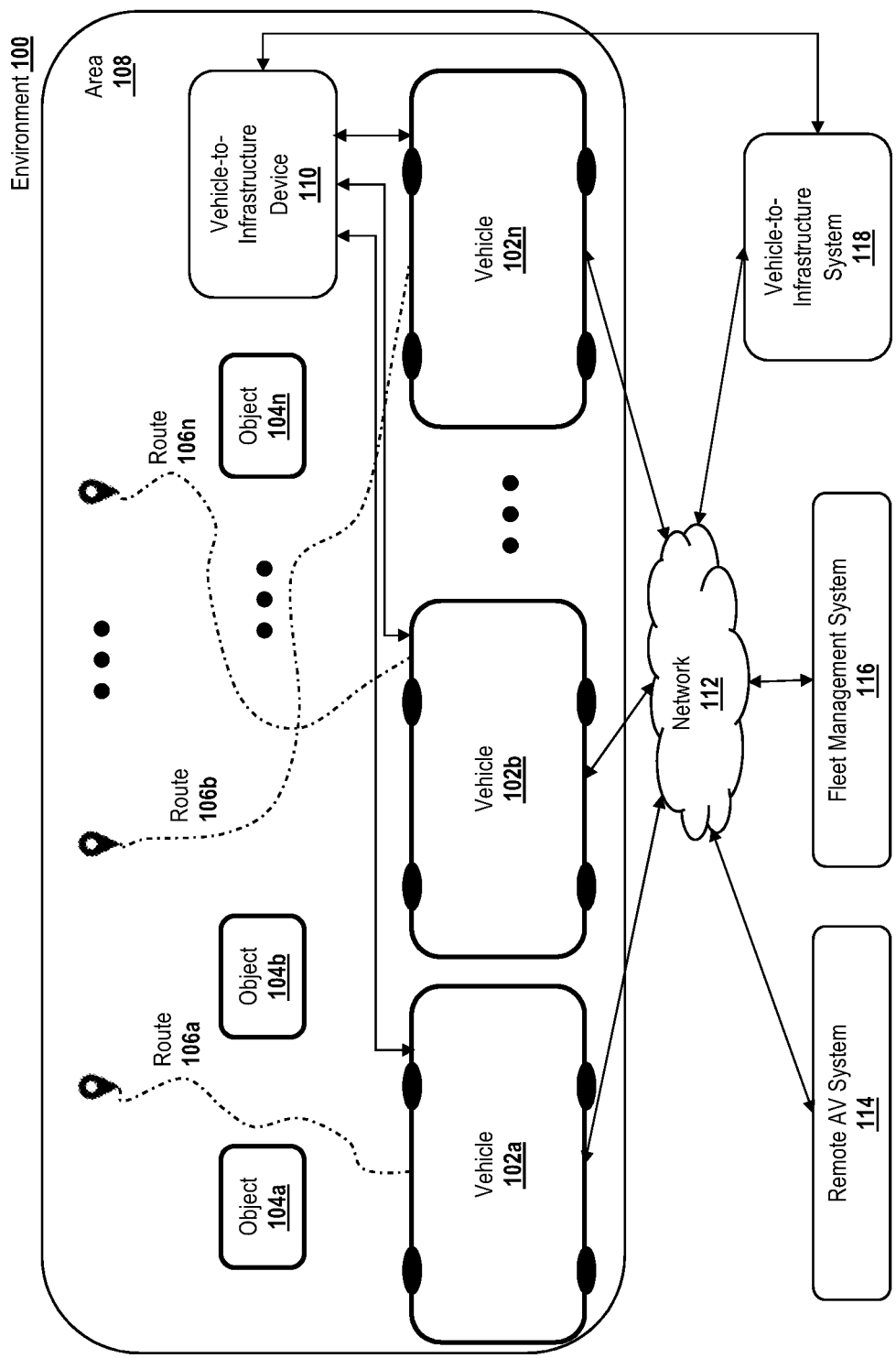
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

"At least one," and "one or more" includes a function being performed by one element, a function being performed by more than one element, e.g., in a distributed fashion, several functions being performed by one element, several functions being performed by several elements, or any combination of the above."

Some embodiments of the present disclosure are described herein in connection with a threshold. As described herein, satisfying, such as meeting, a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, and products described herein include and/or implement a vehicle sensor lens hood that provide for mitigation of straylight, in particular through using a car structure-based lens hood. The lens hood includes a body configured to at least partially surround an image sensor lens which can shield a lens from stray light from both fixed and dynamic light sources. Further, the lens hood can include apertures, such as radially extending apertures, which allow for sensor cleaning, such as by allowing one or more of liquid, air, and debris to pass through the apertures. In some examples, the lens hood is attached to and/or integrated with a structure of the vehicle (e.g., a fascia of the vehicle). In certain implementations, the lens hood is tapered and/or contoured in order to be as close to the camera field-of-view as possible. In some examples, the lens hood is tapered and/or contoured to impinge on the camera field-of-view. Such impinged arrangement may mitigate flare resulting from the reflections that may occur at the edge of the field of view.

By virtue of the implementation of systems and products described herein, techniques for improving the operation of sensors on vehicles, such as autonomous vehicles, can be achieved. Flare light in particular can affect camera performance, which reduces contrast and sharpness, such as by resulting in hazy white dots and streaks. Moreover, the flare light can negatively affect object detection and identification, reducing detection range/sensitivity and potentially creating a safety critical issue. The techniques disclosed can advantageously shield a lens, such as a camera lens, from straylight, either from fixed light sources (e.g., on-vehicle lights) and/or dynamic external light sources (e.g., sun, other vehicles and other road lights). Further, advantageously, the disclosed techniques can provide straylight mitigation while still allowing for effective sensor cleaning, which may not be possible with current devices.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
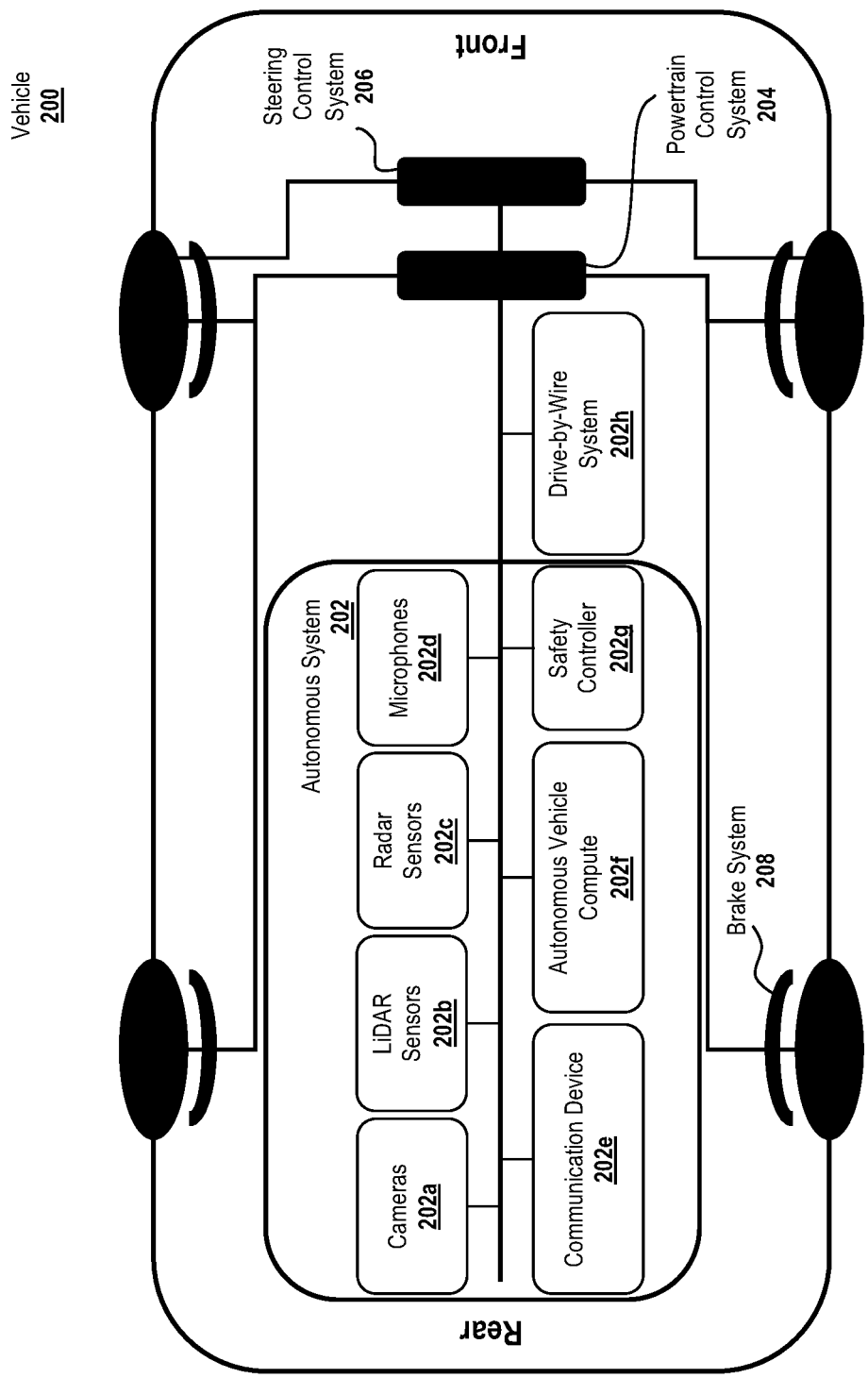
FIG. 2 is a diagram of one or more example systems of a vehicle including an autonomous system.

Referring now to FIG. 2, vehicle 200 (which may be the same as, or similar to vehicle 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
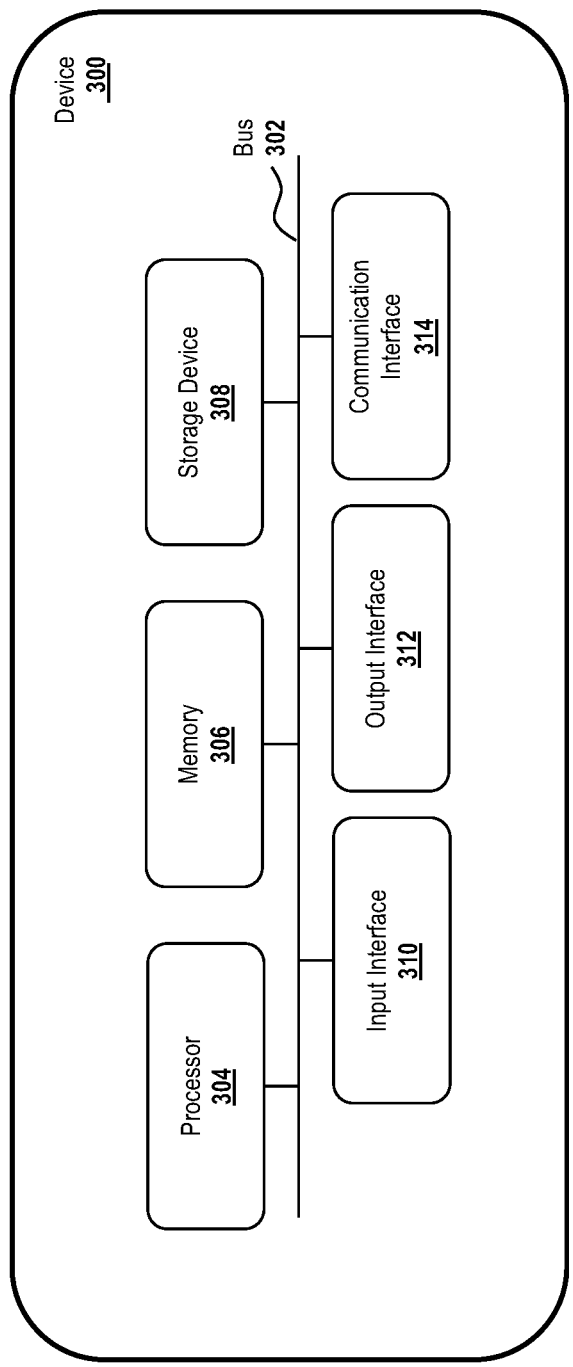
FIG. 3 is a diagram of components of one or more example devices and/or one or more example systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 make longitudinal vehicle motion, such as to start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate. In other words, steering control system 206 causes activities necessary for the regulation of the y-axis component of vehicle motion.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of remote AV system 114, fleet management system 116, V2I system 118, and/or one or more devices of network 112 (e.g., one or more devices of a system of network 112). In some embodiments, one or more devices of vehicles 102 (e.g., one or more devices of a system of vehicles 102 such as at least one device of remote AV system 114, fleet management system 116, and V2I system 118, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
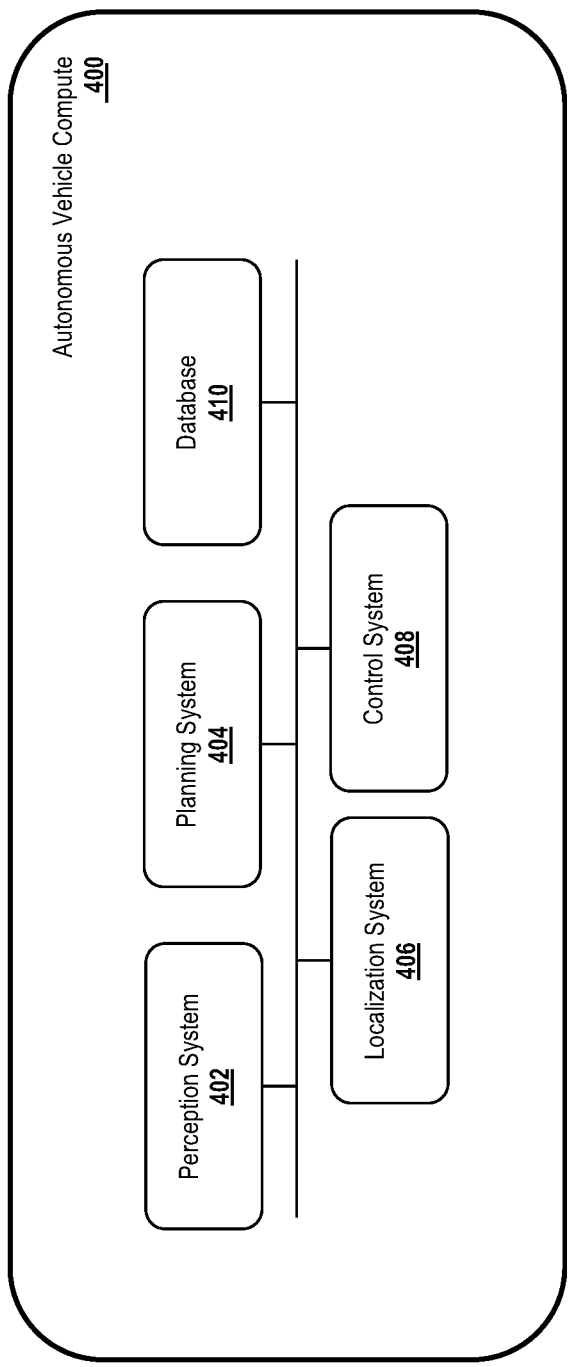
FIG. 4 is a diagram of certain components of an example autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
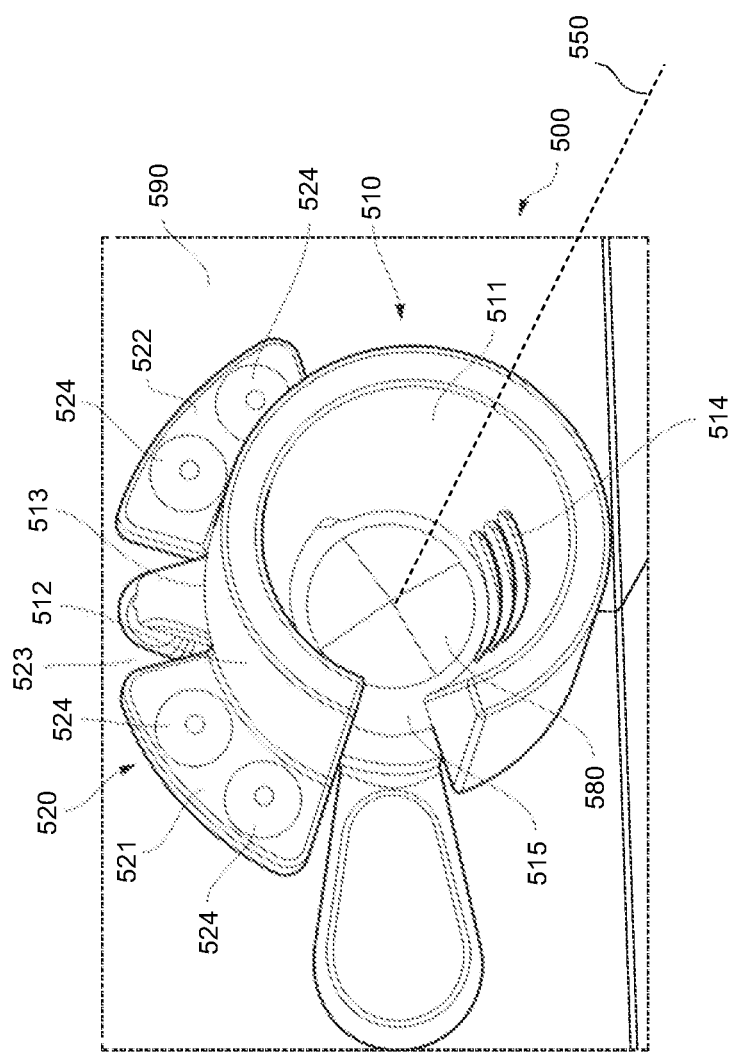
FIG. 5 is a diagram of an example vehicle sensor lens hood.

Referring now to FIG. 5, illustrated is a diagram of a vehicle sensor lens hood 500 for mitigation (e.g., blocking, elimination, reduction or any other suitable form of mitigation) of straylight that can negatively affect the image sensor lens. The vehicle sensor lens hood 500 can be a vehicle image sensor lens hood. As used herein, a "vehicle image sensor lens hood", also referred to as "lens hood", denotes a hood for a sensor lens (e.g., an image sensor) of a vehicle, and an image sensor lens denotes a lens of the image sensor (such as cameras 202a of FIG. 2). In some embodiments, the lens hood 500 is connected with and/or incorporated in a vehicle (e.g., an autonomous vehicle that is the same as, or similar to, vehicle 200 of FIG. 2).

In one or more examples or embodiments, the lens hood 500 is configured to be associated with a structure 590 of a vehicle. As used herein, "associated" with a structure of a vehicle can be construed as attached to the structure of a vehicle and/or integrated with the structure of a vehicle. For example, the structure 590 is one or more of: a fascia (e.g., front or rear fascia), a bumper, a frame, an internal surface, an external surface, a panel, a valance, an exterior surface, a door, a boot, a hood and any other suitable structure of the vehicle. The structure 590 can be at the front, back, side, bottom, and/or top of the vehicle, and the particular location is not limiting.

The lens hood 500 includes a body 510 having an inner wall 511 and an outer wall 512. In other words, the body 510 is radially delimited by the inner wall 511 and the outer wall 512, and a lumen extends through the body 510. Put another way, the inner wall 511 and outer wall 512 can be connected by a connection surface, allowing for the lumen to extend in a longitudinal direction through the body 510. In one or more examples or embodiments, the inner wall 511 of the lens hood 500 forms the lumen. The lumen can be configured to allow the image sensor lens 580 to obtain image data through the body 510. In an example, the inner wall 511 is a radially inner wall and the outer wall 512 is a radially outer wall. The inner wall 511 can be the radially inward most surface of the body 510 and the outer wall 512 can be the radially outward most surface of the body 510.

In one or more examples or embodiments, the inner wall 511 (and, therefore, the body 510) is configured to at least partially surround an image sensor lens 580 included in an image sensor. Put another way, when the lens hood 500 is associated with the structure 590 of a vehicle, the inner wall 511 at least partially surrounds the image sensor lens 580. Partially surrounding as used herein can denote the image sensor lens 580 being located within (or on the same plane as an end of) the lumen extending through the body 510 when the body 510 has a discontinuity in a transverse cross-section of the body 510, such as the discontinuities created by the apertures shown in FIG. 5. In one or more examples or embodiments, the inner wall 511 (and, therefore, the body 510) is configured to entirely surround the image sensor lens 580.

By at least partially surrounding the image sensor lens 580, the body 510 can diminish the amount of straylight reaching the image sensor lens 580, as will be explained below with reference to FIGS. 6A and 6B. In other words, disclosed are embodiments of a lens hood 500 that can prevent degradation of the quality of images obtained using an image sensor (e.g., a camera). For example, the lens hood 500 provides an opaque cover that keeps light from hitting the image sensor lens 580 at particular angles.

In some examples, when the body 510 at least partially surrounds the image sensor lens 580, the body 510 (and, therefore, its inner wall 511 and outer wall 512) substantially extends longitudinally along a longitudinal direction of the image sensor. Put another way, a longitudinal direction of the body 510 is substantially parallel to the longitudinal direction of the image sensor when the body 510 at least partially surrounds the image sensor lens 580. As used herein, a longitudinal direction of the image sensor is defined as a direction substantially parallel to the optical axis of the image sensor lens 580 of the image sensor. The longitudinal direction of the image sensor can be colinear with a longitudinal axis 550 of the body 510 around which the body 510 extends. As shown in FIG. 5, the lens hood 500 longitudinally extends from a proximal end of the lens hood 500 (e.g., the end the closest to the image sensor lens 580) to a distal end of the lens hood 500 (e.g., the end the furthest from the image sensor lens 580) along the longitudinal axis 550.

In one or more examples or embodiments, the lens hood 500 includes a first aperture 513 extending through the body 510 (e.g., through the outer wall 510 and the inner wall 511) and configured to allow one or more of air and liquid to pass through the first aperture 513 in a direction from the outer wall 512 to the inner wall 511, that is, from an exterior of the lens hood 500 towards an interior of the body 510 (e.g., towards the lumen). As used herein, configured to allow one or more of air or liquid to pass through the first aperture 513 can include one or more of: receiving a component configured to provide air or liquid, and receiving air or liquid released by a component configured to provide air or liquid. The first aperture 513 can be disposed at a desired location, position or both location and position relative to a lens cleaning washer nozzle, a lens-cleaning air nozzle or both a lens cleaning washer nozzle and a lens-cleaning air nozzle. Such disposition can facilitate cleaning of the image sensor lens 580. The first aperture can be a first radially extending aperture. As used here, "radially extending aperture" can denote an aperture extending radially through the body 510, that is, from the inner wall 511 to the outer wall 512. In some examples, the first aperture 513 is configured to receive a lens-cleaning air nozzle. In certain implementations, the first aperture 513 is disposed at a top position of the body 510. As used herein, a "top position" of the body 510 is the part of the body 510 that is configured to be disposed at the uppermost position of the body 510 when the lens hood 500 is associated with the structure 590 of a vehicle, and the vehicle is standing on its wheels on a flat surface perpendicular to gravity. In some examples, the first aperture 513 extends along a portion of the longitudinal length of the body 510. In some examples, the first aperture 513 does not extend along an entirety the longitudinal length of the body 510.

In one or more examples or embodiments, the lens hood 500 includes a second aperture 514 extending through the body 510 and configured to allow one or more of liquid and debris particles to pass through the second aperture 514 in a direction from the inner wall 511 to the outer wall 512, that is, from the interior of the body 510 towards the exterior of the lens hood 500. The second aperture 514 can be disposed at a bottom position of the body 510. As used herein, a "bottom position" of the body 510 is the part of the body 510 that is configured to be disposed at the lowermost position of the body 510 when the lens hood 500 is associated with the structure 590 of a vehicle, and the vehicle is standing on its wheels on a flat surface perpendicular to gravity. The second aperture 514 can be a second radially extending aperture. In certain examples, the second aperture 514 is configured to act as a drain, such as for one or more of liquid spray, rain, and debris. For example, the second aperture 514 is shaped and sized to allow liquid, dirt, dust or any other suitable type of substance and/or particle to pass through while preventing larger objects from passing through. In some examples, the second aperture 514 is located between 140 and 220 degrees apart circumferentially from the first aperture 513. In some examples, the first aperture 513 is located opposite (that is, 180 degrees apart from) the second aperture 514, as shown in FIG. 5. Put another way, in such examples, the second aperture 514 is located a half turn apart from the first aperture 513. The second aperture 514 can have one or more of a circular and an ovaloid shape, such as an elongate shape. For example, the second aperture 514 extends along a portion of the circumference of the inner wall 511 and the outer wall 512. In some examples, the second aperture 514 extends along a portion of the longitudinal length of the body 510. In some examples, the second aperture 514 extends along an entirety of the longitudinal length of the body 510.

In certain embodiments, the body includes a plurality of the second aperture 514. In some examples, the second radially extending apertures 514 are elongate radially extending apertures 514 (such as slots) substantially parallel to each other. When used for describing the second radially extending apertures 514, the term "elongate" denotes that the second radially extending apertures 514 have a length dimension that is greater than their width dimension or their thickness dimension, for example greater than twice their width dimension or their thickness dimension. For example, the body 510 includes 2, 3, 4 or 5 second radially extending apertures 514. In some examples, each of the plurality of second radially extending apertures 514 are the same shape. In other examples, some of the plurality of second radially extending apertures 514 are the same shape and some have a different shape. The second radially extending apertures 514 can be positioned on a proximal half of the body 510 (e.g., on the half the closest to the image sensor lens 580 when the lens hood 500 is associated with the structure 590 of the vehicle).

In one or more embodiments or examples, the lens hood 500 further includes a third aperture 515 extending through the body 510 and configured to allow liquid to pass through the third aperture 515 in a direction from the outer wall 512 to the inner wall 511. The third aperture 515 can be a third radially extending aperture. In some examples, the third aperture 515 is shaped and configured to receive a portion or an entirety of a lens cleaning washer nozzle (e.g., a telescoping lens cleaning washer nozzle). In some implementations, the third aperture 515 is shaped and configured to receive fluid (e.g., washing fluid) and/or liquid spray from a lens cleaning washer nozzle. In certain examples, such as that of FIG. 5, the third aperture 515 tapers (e.g., as defined by the radial surface extending between the outer wall 512 and the inner wall 511) between the outer wall 512 and the inner wall 511, wherein the third aperture 515 is larger at the outer wall 512 than at the inner wall 511. In other examples, the third aperture 515 does not taper between the outer wall 512 and the inner wall 511. In some examples, the third aperture 515 extends along a portion of the longitudinal length of the body 510. In some examples, such as that of FIG. 5, the third aperture 515 extends along an entirety of the longitudinal length of the body 510.

In some examples, the third aperture 515 is located between 70 and 120 degrees apart circumferentially from the first aperture 513. In some examples, the first aperture 513 is located 90 degrees apart from the third aperture 515, as shown in FIG. 5. Put another way, in such examples, the third aperture 515 is located a quarter turn apart from the first aperture 513. In some examples, the third aperture 515 is located circumferentially between the first aperture 513 and the second aperture 514 (e.g., being less than 180 degrees from both the first aperture 513 and the second aperture 514). For example, the third aperture 515 is located halfway along a circumference of the body 510 between the first aperture 513 and the second aperture 514 (such as 90 degrees apart from both the first aperture 513 and the second aperture 514). The first aperture 513, the second aperture 514, the third aperture 515 or any other aperture included in the lens hood 500 can be shaped as slots, gaps, cutouts, holes or any other suitable form.

In some embodiments, the body 510 is construed as an annulus, and the first aperture 513 is construed as a section of said annulus (e.g., according to a transverse cross-section of the lens hood 500. Put another way, according to such transverse cross-section, the first aperture 513 is disposed between sections of annuli of the body 510. As used herein, the term "transverse" refers to the direction that is perpendicular to the longitudinal axis 550. Any reference to the "cross-section" of the lens hood 500, the body 510 or a component of any of them refers to the transverse cross-section unless stated otherwise.

In one or more embodiments or examples, the longitudinal axis of the body 510 includes a first longitudinal segment and a second longitudinal segment. For example, the first aperture 513 and the third aperture 515 define respective sections of annuli separated from one another according to a transverse cross-section of the body that intersects the first longitudinal segment. Put another way, the first aperture 513 and the third aperture 515 are disposed between sections of annuli of the body 510. In one or more embodiments or examples, the third aperture 515 defines a section of an annulus according to a transverse cross-section of the body that intersects the first longitudinal segment (e.g., the third aperture 515 is disposed between sections of annuli of the body 510) and the first aperture 513 is non-intersecting relative to the transverse cross-section of the lens hood 500 that intersects the second longitudinal segment. In other words, the first aperture 513 (which can be the "air" aperture) only extends, longitudinally, along a portion of the body 510, whilst the third aperture 515 (which can be the "water" aperture) extends along a longer portion or along the whole length of the body 510, in certain examples.

In one or more embodiments or examples, the inner wall 511, the outer wall 512, and/or both are shaped as a section of a cylinder, a section of a cone, and combinations thereof. For example, the inner wall 511 and/or the outer wall 512 have one or more of a cylindrical shape (e.g., having the same diameter along a longitudinal length of the body) and a conical shape (e.g., having a different diameter—e.g., a taper—along a longitudinal length of the body). In some examples or embodiments, the inner wall 511 and/or the outer wall 512 have both a cylindrical section and a conical section. In one or more example or embodiments, the inner wall 511 and/or the outer wall 512 have further shaped sections as well, and the particular shape is not limiting. In some implementations, the inner wall 511 and the outer wall 512 have the same shape. In some implementations, the inner wall 511 and the outer wall 512 have different shapes. In some examples, the inner wall 511 is shaped in order to provide an optimized field of view for an image sensor (e.g., via the image sensor lens 580), while minimizing straylight from interacting with the image sensor. In one or more examples or embodiments, the inner wall 511 is contoured to the field-of-vision (FoV) of the image sensor to provide the best coverage.

Figure 6:
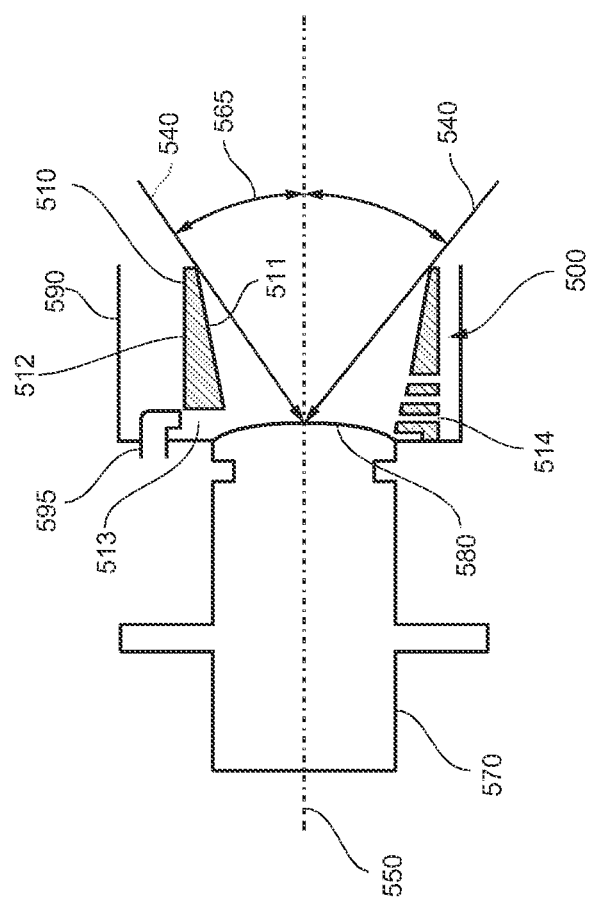
FIG. 6 is a diagram of an example vehicle sensor whose lens is surrounded by a vehicle sensor lens hood.

In one or more embodiments or examples, the body 510 is configured to prevent light rays forming an angle of more than 50 degrees, preferably 43 degrees, more preferably 20 degrees, with the longitudinal axis 550 of the body 510 from reaching the image sensor lens 580. Such one or more embodiments or examples can be described with reference to FIG. 6, illustrating the maximum angle 565 that the incident light 540 and the longitudinal axis 550 can form as a result of the shape and position of the body 510 of the lens hood 500 associated to the structure 590. In other words, according to the longitudinal cross-section shown in FIG. 6, the maximum angle that two light rays 540 reaching the lens 580 of an image sensor 570 can form (which in one or more examples is 100 degrees, preferably 86 degrees, more preferably 40 degrees) is twice the maximum angle 565 between the incident light 540 and the longitudinal axis 550. In the embodiment or example depicted in FIG. 6, the first aperture 513 is configured to receive the lens-cleaning air nozzle 595.

Figure 7:
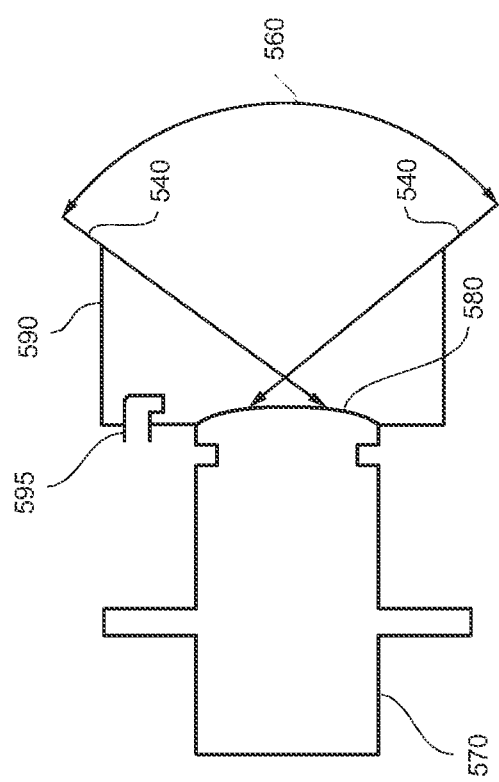
FIG. 7 is a diagram of an example vehicle sensor whose lens is not surrounded by a vehicle sensor lens hood.

Referring now to FIG. 7, a vehicle is shown that includes a structure 590 to which no lens hood is associated. As shown, the maximum angle 560 that incident light rays 540 can form is substantially greater than the maximum angle described with reference to FIG. 6. Accordingly, the lens 580 of the image sensor 570 can receive straylight from the incident light rays 540, which can degrade the quality of images obtained using the image sensor 570.

As mentioned with reference to FIG. 5 and FIG. 6, the lens hood 500 is configured to be associated with a structure 590 of a vehicle. For example, the lens hood 500 is integrally formed with the structure 590 of the vehicle. In some examples, the lens hood 500 is attached (e.g., via welding, permanently attached, removably attached) to the structure 590. In one or more embodiments or examples, the lens hood 500 includes a fastener 520, which is integral and/or attached with the body 510. In certain examples, the fastener 520 is configured to be attached to the structure 590 of the vehicle, as opposed to the body 510 itself. Such configuration can allow for less accumulation of debris compared to lens hoods integrated with the image sensor. As shown in FIG. 5, in certain examples the fastener 520 is located on a rim of the body 510, such as on a rim of the outer surface 512.

In one or more embodiments or examples, the fastener 520 includes at least one flap 521, 522 protruding from the body 510. The flap 521, 522 can extend radially from an outer wall 512 of the lens hood 500. In some examples, the flap 521, 522 is located on a proximal end of the lens hood 500. The flap 521, 522 can extend along a circumferential portion of the lens hood 500. As shown in FIG. 5, the lens hood 500 can include two flaps 521, 522 (e.g., a first flap 521 and a second flap 522). In one or more embodiments or examples, the first flap 521 and the second flap 522 are arranged separated from one another. For example, a separation 523 between the first flap 521 and the second flap 522 is adjacent to the first aperture 513. In some examples, the flaps 521, 522 are located on the same side of the lens hood 500 (e.g., within 180 degrees of one another). In some examples, the flaps 521, 522 are located on opposite sides of the lens hood 500 (e.g., further than 180 degrees apart from one another).

In one or more embodiments or examples, the fastener 520 is configured to be attached to the structure 590 of the vehicle by one or more of: rivets, adhesive, screwing, welding and clips. In the example of FIG. 5, the first flap 521 and the second flap 522 are attached to the structure 590 by means of rivets 524. For example, the fastener 520 includes one or more through holes for receiving of a screw, bolt or the like. The particular type of attachment is not limiting.

Figure 8A:
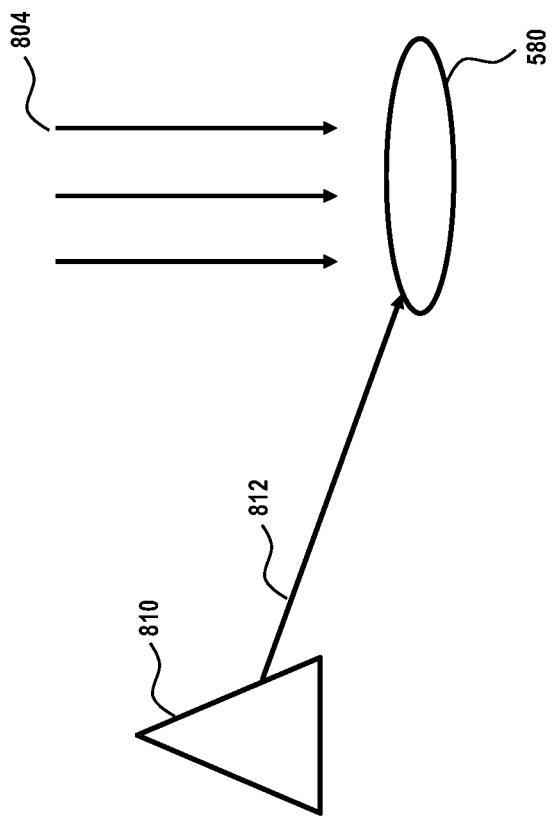
FIGS. 8A-8B are diagrams showing a vehicle sensor whose lens is respectively not surrounded and at least partially surrounded by an example vehicle sensor lens hood.
Figure 8B:
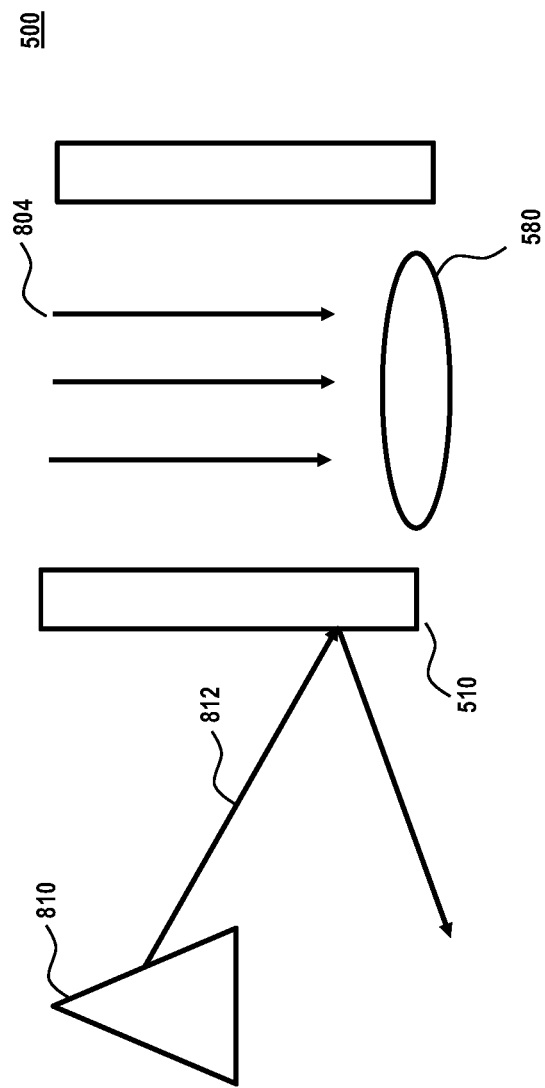

FIGS. 8A-8B illustrate the advantageous use of the lens hood 500 as discussed with respect to FIG. 5-FIG. 6. FIG. 8A depicts an image sensor having an image sensor lens 580 without the use of a lens hood (e.g., similar to FIG. 7). As shown, while the image sensor lens 580 obtains images from directly in front (as shown by reference number 804), the image sensor lens 580 additionally receives straylight 812 at an angle from another illumination source 810. As discussed above, straylight 812 can negatively affect the performance of the image sensor including the image sensor lens 580.

FIG. 8B shows the same image sensor lens 580 now associated with a lens hood 500. As shown, the body 510 of the lens hood 500 does not prevent the image sensor lens 580 from obtaining images directly in front (as shown by reference number 804). However, in this example, the body 510 of the lens hood 500 blocks (such as reflects) at least a portion of straylight 812, therefore improving performance of the image sensor including image sensor lens 580.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Also disclosed are lens hoods, vehicles, and autonomous vehicles and according to any of the following items:

Item 1. A vehicle sensor lens hood for reducing straylight on an image sensor lens, the lens hood comprising:
- a body having an inner wall and an outer wall, wherein the inner wall is configured to at least partially surround the image sensor lens;
- a first aperture extending through the body and configured to allow one or more of air and liquid to pass through the first aperture in a direction from the outer wall to the inner wall;
- a second aperture extending through the body configured to allow one or more of liquid and debris particles to pass through the second aperture in a direction from the inner wall to the outer wall;
- wherein the lens hood is configured to be associated with a structure of a vehicle.

Item 2. The lens hood of Item 1, further comprising:
- a third aperture extending through the body and configured to allow liquid to pass through the third aperture in a direction from the outer wall to the inner wall.

Item 3. The lens hood of any one of the preceding Items, wherein, according to a transverse cross-section of the lens hood, the first aperture defines a section of an annulus.

Item 4. The lens hood of Items 2 and 3, wherein a longitudinal axis of the body comprises a first longitudinal segment and a second longitudinal segment;
- wherein, according to a transverse cross-section of the body that intersects the first longitudinal segment, the first aperture and the third aperture define respective sections of annuli separated from one another; and
- wherein, according to a transverse cross-section of the lens hood that intersects the second longitudinal segment, the third aperture defines a section of an annulus and the first aperture is non-intersecting relative to the transverse cross-section that intersects the second longitudinal segment.

Item 5. The lens hood of any one of the preceding Items, wherein one or more of the inner wall and the outer wall comprise one or more of: a section of a cylinder and a section of a cone.

Item 6. The lens hood of Item 5, wherein the inner wall comprises a section of a cone and the outer wall comprises a section of a cylinder.

Item 7. The lens hood of any one of the preceding Items, wherein the body is configured to, when associated with the structure of the vehicle, prevent light rays forming an angle of more than 50 degrees, preferably 43 degrees, more preferably 20 degrees, with the longitudinal axis of the body from reaching the image sensor lens.

Item 8. The lens hood of any one of the preceding Items, wherein the body comprises a plurality of second radially extending apertures, and wherein the plurality of second radially extending apertures are a plurality of elongate radially extending apertures substantially parallel to each other.

Item 9. The lens hood of any one of the preceding Items, wherein the lens hood further comprises:
- a fastener integral with the body, the fastener being configured to be attached to the structure of the vehicle.

Item 10. The lens hood of Item 9, wherein the fastener comprises at least one flap protruding from the body.

Item 11. The lens hood of Item 10, wherein the at least one flap comprises a first flap protruding radially from the body and a second flap protruding radially from the body.

Item 12. The lens hood of Item 11, wherein the first flap and the second flap are arranged separated from one another, and wherein a separation between the first flap and the second flap is adjacent to the first aperture.

Item 13. The lens hood of any one of Items 9 to 12, wherein the fastener is configured to be attached to the structure of the vehicle by one or more of: rivets, adhesive, screwing, welding and clips.

Item 14. A vehicle comprising:
- a structure;
- an image sensor comprising an image sensor lens;
- a lens hood comprising:
  - a body having an inner wall and an outer wall, wherein the inner wall at least partially surrounds the image sensor lens;
  - a first aperture extending through the body and configured to allow one or more of air and liquid to pass through the first aperture in a direction from the outer wall to the inner wall;
  - a second aperture extending through the body configured to allow one or more of liquid and debris particles to pass through the second aperture in a direction from the inner wall to the outer wall;
- wherein the lens hood is associated with the structure.

Item 15. The vehicle of Item 14, the lens hood further comprising:
- a third aperture extending through the body and configured to allow liquid to pass through the third aperture in a direction from the outer wall to the inner wall.

Item 16. The vehicle of any of Items 14 to 15, wherein, according to a transverse cross-section of the lens hood, the first aperture defines a section of an annulus.

Item 17. The vehicle of Item 15 and Item 16, wherein a longitudinal axis of the body comprises a first longitudinal segment and a second longitudinal segment;
- wherein, according to a transverse cross-section of the body that intersects the first longitudinal segment, the first aperture and the third aperture define respective sections of annuli separated from one another; and wherein, according to a transverse cross-section of the lens hood that intersects the second longitudinal segment, the third aperture defines a section of an annulus and the first aperture is non-intersecting relative to the transverse cross-section that intersects the second longitudinal segment.

Item 18. The vehicle of any one of Items 14 to 17, wherein one or more of the inner wall and the outer wall comprise one or more of: a section of a cylinder and a section of a cone.

Item 19. The vehicle of Item 18, wherein the inner wall comprises a section of a cone and the outer wall comprises a section of a cylinder.

Item 20. The vehicle of any one of Items 14 to 19, wherein the body is configured to, when associated with the structure, prevent light rays forming an angle of more than 50 degrees, preferably 43 degrees, more preferably 20 degrees, with the longitudinal axis of the body from reaching the image sensor lens.

Item 21. The vehicle of any one of Items 14 to 20, wherein the body comprises a plurality of second radially extending apertures, and wherein the plurality of second radially extending apertures are a plurality of elongate radially extending apertures substantially parallel to each other.

Item 22. The vehicle of any one of Items 14 to 21, wherein the lens hood further comprises:
 a fastener integral with the body, the fastener being configured to be attached to the structure.

Item 23. The vehicle of Item 22, wherein the fastener comprises at least one flap protruding from the body.

Item 24. The vehicle of Item 23, wherein the at least one flap comprises a first flap protruding radially from the body and a second flap protruding radially from the body.

Item 25. The vehicle of Item 24, wherein the first flap and the second flap are arranged separated from one another, and wherein a separation between the first flap and the second flap is adjacent to the first aperture.

Item 26. The vehicle of any one of Items 22 to 25, wherein the fastener is configured to be attached to the structure by one or more of: rivets, adhesive, screwing, welding and clips.

Item 27. The vehicle of any one of Items 14 to 26, the vehicle comprising one or more of: a lens-cleaning washer nozzle and a lens-cleaning air nozzle.

Item 28. An autonomous vehicle comprising:
 a structure;
 an image sensor comprising an image sensor lens;
 a lens hood comprising:
  a body having an inner wall and an outer wall, wherein the inner wall at least partially surrounds the image sensor lens;
  a first aperture extending through the body and configured to allow one or more of air and liquid to pass through the first aperture in a direction from the outer wall to the inner wall;
  a second aperture extending through the body configured to allow one or more of liquid and debris particles to pass through the second aperture in a direction from the inner wall to the outer wall;
 wherein the lens hood is associated with the structure.

Item 29. The autonomous vehicle of Item 28, the lens hood further comprising:
 a third aperture extending through the body and configured to allow liquid to pass through the third aperture in a direction from the outer wall to the inner wall.

Item 30. The autonomous vehicle of any of Items 28 to 29, wherein, according to a transverse cross-section of the lens hood, the first aperture defines a section of an annulus.

Item 31. The autonomous vehicle of Item 29 and Item 30, wherein a longitudinal axis of the body comprises a first longitudinal segment and a second longitudinal segment;
 wherein, according to a transverse cross-section of the body that intersects the first longitudinal segment, the first aperture and the third aperture define respective sections of annuli separated from one another; and
 wherein, according to a transverse cross-section of the lens hood that intersects the second longitudinal segment, the third aperture defines a section of a annulus and the first aperture is non-intersecting relative to the transverse cross-section that intersects the second longitudinal segment.

Item 32. The autonomous vehicle of any one of Items 28 to 31, wherein one or more of the inner wall and the outer wall comprise one or more of: a section of a cylinder and a section of a cone.

Item 33. The autonomous vehicle of Item 32, wherein the inner wall comprises a section of a cone and the outer wall comprises a section of a cylinder.

Item 34. The autonomous vehicle of any one of Items 28 to 33, wherein the body is configured to, when associated with the structure, prevent light rays forming an angle of more than 50 degrees, preferably 43 degrees, more preferably 20 degrees, with the longitudinal axis of the body from reaching the image sensor lens.

Item 35. The autonomous vehicle of any one of Items 28 to 34, wherein the body comprises a plurality of second radially extending apertures, and wherein the plurality of second radially extending apertures are a plurality of elongate radially extending apertures substantially parallel to each other.

Item 36. The autonomous vehicle of any one of Items 28 to 35, wherein the lens hood further comprises:
 a fastener integral with the body, the fastener being configured to be attached to the structure.

Item 37. The autonomous vehicle of Item 36, wherein the fastener comprises at least one flap protruding from the body.

Item 38. The autonomous vehicle of Item 37, wherein the at least one flap comprises a first flap protruding radially from the body and a second flap protruding radially from the body.

Item 39. The autonomous vehicle of Item 38, wherein the first flap and the second flap are arranged separated from one another, and wherein a separation between the first flap and the second flap is adjacent to the first aperture.

Item 40. The autonomous vehicle of any one of Items 36 to 39, wherein the fastener is configured to be attached to the structure by one or more of: rivets, adhesive, screwing, welding and clips.

Item 41. The autonomous vehicle of any one of Items 28 to 40, the autonomous vehicle further comprising one or more of: a lens-cleaning washer nozzle and a lens-cleaning air nozzle.

What is claimed is:

1. A vehicle sensor lens hood for reducing straylight on an image sensor lens, the vehicle sensor lens hood comprising:
 a body having an inner wall and an outer wall, wherein the inner wall is configured to at least partially surround the image sensor lens;
 a nozzle configured to discharge one or more of air and liquid in a direction perpendicular to an axis of rotation of the body;

a first aperture located at an uppermost position of the body in a fixed position, the first aperture extending through the body and configured to allow one or more of air and liquid to pass through the first aperture from the outer wall to the inner wall in a direction parallel to a direction of discharge of the nozzle; and a second aperture in a fixed position on the body opposite the first aperture and extending through the body in the direction parallel to the direction of discharge of the nozzle, the second aperture configured to allow one or more of liquid and debris particles to pass through the second aperture;

wherein the lens hood is configured to be associated with a structure of a vehicle.

2. The lens hood of claim 1, wherein the nozzle is configured to discharge air, further comprising:

a third aperture in a fixed position on the body between the first aperture and the second aperture extending through the body and configured to allow liquid to pass through the third aperture in a direction from the outer wall to the inner wall.

3. The lens hood of claim 2, wherein a longitudinal axis of the body comprises a first longitudinal segment and a second longitudinal segment;

wherein, according to a transverse cross-section of the body that intersects the first longitudinal segment, the first aperture and the third aperture define respective sections of annuli separated from one another, wherein, according to a transverse cross-section of the lens hood that intersects the second longitudinal segment, the third aperture defines a section of an annulus and the first aperture is non-intersecting relative to the transverse cross-section that intersects the second longitudinal segment.

4. The lens hood of claim 1, wherein, according to a transverse cross-section of the lens hood, the first aperture defines a section of an annulus.

5. The lens hood of claim 1, wherein one or more of the inner wall and the outer wall comprise one or more of: a section of a cylinder and a section of a cone.

6. The lens hood of claim 5, wherein the inner wall comprises a section of a cone and the outer wall comprises a section of a cylinder.

7. The lens hood of claim 1, wherein the body is configured to, when associated with the structure of the vehicle, prevent light rays forming an angle of more than 50 degrees with a longitudinal axis of the body from reaching the image sensor lens.

8. The lens hood of claim 1, wherein the body comprises a plurality of second radially extending apertures, and wherein the plurality of second radially extending apertures are a plurality of elongate radially extending apertures substantially parallel to each other.

9. The lens hood of claim 1, wherein the lens hood further comprises:

a fastener integral with the body, the fastener being configured to be attached to the structure of the vehicle.

10. The lens hood of claim 9, wherein the fastener comprises at least one flap protruding from the body.

11. The lens hood of claim 10, wherein the at least one flap comprises a first flap protruding radially from the body and a second flap protruding radially from the body.

12. The lens hood of claim 11, wherein the first flap and the second flap are arranged separated from one another, and wherein a separation between the first flap and the second flap is adjacent to the first aperture.

13. The lens hood of claim 9, wherein the fastener is configured to be attached to the structure of a vehicle by one or more of: rivets, adhesive, screwing, welding and clips.

14. A vehicle comprising:

a structure;

an image sensor comprising an image sensor lens; and a lens hood comprising:

a body having an inner wall and an outer wall, wherein the inner wall at least partially surrounds the image sensor lens;

a nozzle configured to discharge one or more of air and liquid in a direction perpendicular to an axis of rotation of the body;

a first aperture located at an uppermost position of the body in a fixed position, the first aperture extending through the body and configured to allow one or more of air and liquid to pass through the first aperture from the outer wall to the inner wall in a direction parallel to a direction of discharge of the nozzle; and a second aperture in a fixed position on the body opposite the first aperture and extending through the body in the direction parallel to the direction of discharge of the nozzle, the second aperture configured to allow one or more of liquid and debris particles to pass through the second aperture;

wherein the lens hood is associated with the structure.

15. The vehicle of claim 14, wherein the nozzle is configured to discharge air, the lens hood further comprising:

a third aperture in a fixed position on the body between the first aperture and the second aperture extending through the body and configured to allow liquid to pass through the third aperture in a direction from the outer wall to the inner wall.

16. The vehicle of claim 14, wherein the body comprises a plurality of second radially extending apertures, and wherein the plurality of second radially extending apertures are a plurality of elongate radially extending apertures substantially parallel to each other.

17. The vehicle of claim 14, wherein the lens hood further comprises:

a fastener integral with the body, the fastener being configured to be attached to the structure.

18. The vehicle of claim 14, wherein the nozzle comprises one or more of: a lens-cleaning washer nozzle or a lens-cleaning air nozzle.

19. An autonomous vehicle comprising:

a structure;

an image sensor comprising an image sensor lens; and a lens hood comprising:

a body having an inner wall and an outer wall, wherein the inner wall at least partially surrounds the image sensor lens;

a nozzle configured to discharge one or more of air and liquid in a direction perpendicular to an axis of rotation of the body;

a first aperture located at an uppermost position of the body in a fixed position, the first aperture extending through the body and configured to allow one or more of air and liquid to pass through the first aperture from the outer wall to the inner wall in a direction parallel to a direction of discharge of the nozzle; and a second aperture in a fixed position on the body opposite the first aperture and extending through the body in the direction parallel to the direction of discharge of the nozzle, the second aperture configured to allow one or more of liquid and debris particles to pass through the second aperture;

wherein the lens hood is associated with the structure.

20. The autonomous vehicle of claim 19, wherein the nozzle comprises one or more of: a lens-cleaning washer nozzle or a lens-cleaning air nozzle.

* * * * *